United States Patent
Telkar et al.

(10) Patent No.: US 12,332,851 B1
(45) Date of Patent: Jun. 17, 2025

(54) GENERATION OF DIVERSE SIMULATED DATA

(71) Applicant: SAP SE, Walldorf (DE)

(72) Inventors: Prashant Telkar, Bangalore (IN); Dharithri Rai B, Mangalore (IN); Meldon Malcolm Dcunha, Mumbai (IN); Manan Dey, Guwahati (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/607,758

(22) Filed: Mar. 18, 2024

(51) Int. Cl.
*G06F 16/00* (2019.01)
*G06F 11/34* (2006.01)
*G06F 16/21* (2019.01)
*G06F 16/25* (2019.01)

(52) U.S. Cl.
CPC ........ *G06F 16/212* (2019.01); *G06F 11/3457* (2013.01); *G06F 16/258* (2019.01)

(58) Field of Classification Search
CPC ... G06F 16/212; G06F 16/258; G06F 11/3457
USPC ........................................................ 707/803
See application file for complete search history.

(56) References Cited

U.S. PATENT DOCUMENTS

| 11,620,303 B1* | 4/2023 | Roy | G06F 16/313 |
| | | | 707/736 |
| 2022/0237212 A1* | 7/2022 | Dixit | G06F 16/288 |
| | | | 707/707 |

* cited by examiner

*Primary Examiner* — Alexandria Y Bromell
(74) *Attorney, Agent, or Firm* — Buckley, Maschoff & Talwalkar LLC

(57) ABSTRACT

A system and method include reception of a data object template comprising a plurality of fields and a respective value for each of the plurality of fields, determination of at least one master data-dependent field of the plurality of fields, generation of a plurality of data instances comprising the respective value for each of the plurality of fields except for the at least one master data-dependent field, where a value of the at least one master data-dependent field in each of the plurality of data instances is different from the respective value of the at least one master data-dependent field in the data object template, input of each of the plurality of data instances into a machine learning model to determine a likelihood of successful deployment for each of the plurality of data instances, and determination of a second plurality of data instances for deployment based on the determined likelihoods.

20 Claims, 9 Drawing Sheets

GENERATION OF DIVERSE SIMULATED DATA

BACKGROUND

The computing landscape of a modern organization typically consists of several database systems. These systems may include one or more development systems on which the organization installs, configures, and customizes a database system, one or more test systems which are used to test the thusly-configured and customized database system, and a productive system which executes the configured and customized database system to receive customer requests and conduct customer transactions. These systems may be implemented, for example, as distinct tenants of a single database system, or as separate single-tenant database systems.

The data of a database system may be generally categorized as master data or transaction data. Master data remains largely static and may describe entities such as customers, vendors, products, and other organizational units. Master data is typically shared across processes and transactions, serving as a common resource for multiple facets of an organization's operations. Transaction data, in contrast, may represent activities and events carried out in the organization. Transaction data encompasses records of a wide range of transactions, including but not limited to sales orders, purchase orders, invoices, deliveries, and production orders. For example, a sales order may reference fields of a customer's master data, and a purchase order may reference fields of a vendor's master data.

Development, testing and demonstration systems typically require master data and transaction data for operation. According to current approaches, transaction data from one system may be deployed to another system, but dependent master data within the transaction data is first manually modified prior to deploying the transaction data to the other system. For example, the customer information associated with each of multiple sales orders may be altered within each sales order prior to deployment. However, no functionality exists to customize the customer information, which therefore remains unchanged at each deployment. Moreover, data deployment may fail if the structure of the deployed data does not align with the requirements of the target database system or if the necessary master data is missing or inaccurate.

DETAILED DESCRIPTION

The following description is provided to enable any person in the art to make and use the described embodiments. Various modifications, however, will be readily-apparent to those in the art.

Some embodiments facilitate efficient generation and deployment of large volumes of transaction data including a diverse array of dependent master data. For example, a user selects a given transaction data template and the master data-dependent fields of the template are identified. Multiple instances of the transaction data template are generated, although with values of the master data-dependent fields being replaced with known master data. The field values of each instance are passed to a predictive model to determine which of the transaction data instances can be successfully deployed to a specified target system. The successfully-deployable transaction data instances are then deployed to the target system.

Figure 1:
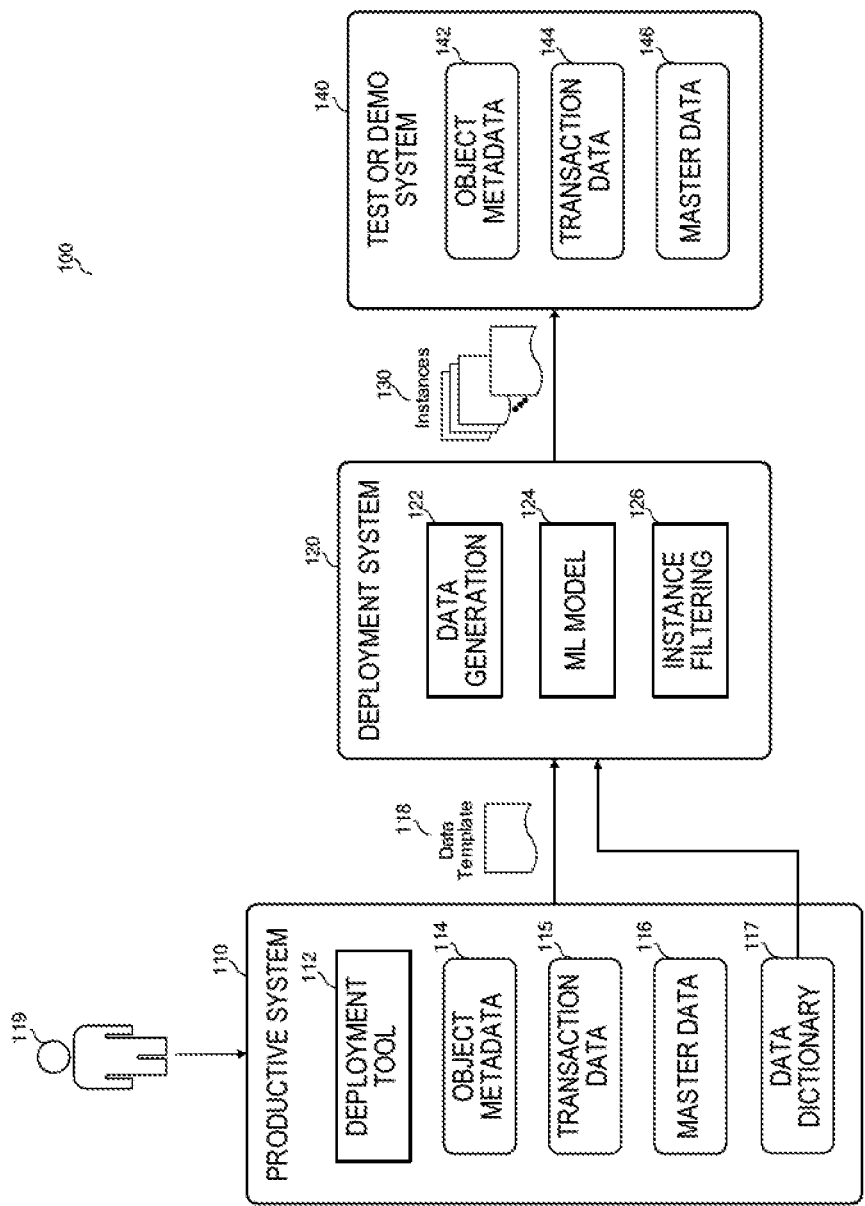
FIG. 1 illustrates generation of simulated transaction data within a computing landscape according to some embodiments.

FIG. 1 illustrates an architecture according to some embodiments. Each of the illustrated components of FIG. 1 may be implemented using any suitable combinations of computing hardware and/or software that are or become known. Such combinations may include cloud-based implementations in which computing resources are virtualized and allocated elastically. In some embodiments, two or more components are implemented by a single computing device.

Landscape 100 includes productive system 110 which may comprise a single tenant or multi-tenant database system implemented using any technology that is or becomes known. In some examples, productive system 110 and each other system of landscape 100 may be on-premise, cloud-based, distributed (e.g., with distributed storage and/or compute nodes) and/or deployed in any other suitable manner. Each system may comprise disparate cloud-based services, a single computer server, a cluster of servers, and any other combination that is or becomes known. All or a part of each system may utilize Infrastructure-as-a-Service (IaaS), Platform-as-a-Service (PaaS) and/or Software-as-a-Service (SaaS) offerings owned and managed by one or more different entities as is known in the art. Landscape 100 may include more or fewer systems of each type, other types of systems, and any other components as are known in the art, including but not limited to services, applications, data stores, proxies, redundancies, and availability zones.

Productive system 110 includes object metadata 114 describing the structure and interrelationships (i.e., the schema) of data representing various logical entities. Object metadata 114 may include metadata describing master data objects (e.g., customer object, a vendor object, a material object) and transaction data objects (e.g., a sales order object, a production order object). Each data object may include data and logic as is known in the art.

Each data object includes a number of fields, each of which may be assigned one or more attributes (e.g., key field, runtime field) by object metadata 114. One or more of the fields of a transaction data object may be defined as a master data-dependent field. For example, a sales order object may include a Customer field which is defined as master data-dependent. Object metadata 114 may be specified during configuration of productive system 110 in some embodiments.

Figure 2:
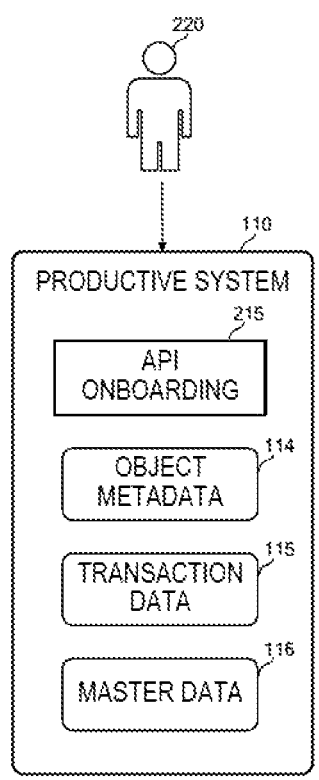
FIG. 2 illustrates a productive system during configuration according to some embodiments.

FIG. 2 illustrates productive system 110 during configuration according to some embodiments. Productive system 110 includes program code of API onboarding application 215. According to some embodiments, administrator 220 may access an interface provided by API onboarding application 215 to define objects and their constituent fields within object metadata 114. Defining the objects may include identifying master data-dependent fields within one or more transaction data objects. Object metadata 114 may be pre-populated with metadata of some data objects by a provider of system 110, and some of this pre-populated metadata may be modified by administrator 220 in some embodiments.

API onboarding application 215 may allow administrator 220 to deploy an object defined in object metadata 114. Such deployment may cause generation of corresponding tables within transaction data 115 or master data 116 to store data of instances of the deployed object. In this regard, transaction data 115 and master data 116 include instances of the objects defined by object metadata 114. For example, transaction data 115 may include many different sales order object instances, each of which is associated with a specific sales order. Similarly, master data 116 may include several customer object instances, each of which is associated with a different customer. The values of transaction data 115 and master data 116 may be stored in tabular or any other format.

Data dictionary 117 of FIG. 1 stores values assigned to the fields of master data 116. For example, data dictionary 117 may include values of master data-dependent fields and of fields related to organizations (e.g., localization code, salesOrganization id, storage location). In other examples, data dictionary 117 may store all values which are stored in a Name field of all customer object instances, all values which are stored in an Address field of all customer object instances, etc. Data dictionary 117 may also store values of fields of transaction data 115 in some embodiments. The values stored in data dictionary 117 may be accumulated during productive operation of system 110. According to some embodiments, data dictionary 117 accumulates transaction data values from other systems in addition to system 110.

Figure 3:
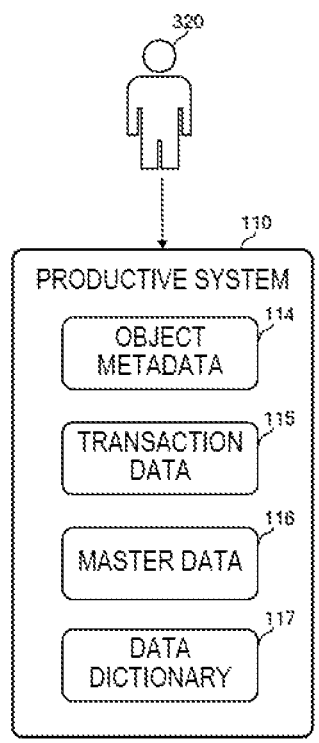
FIG. 3 illustrates a productive system at runtime according to some embodiments.

FIG. 3 illustrates productive system 110 at runtime according to some embodiments. User 320 may (directly or via an intermediate application (not shown)) issue runtime requests to productive system 110. The requests may cause creation or modification of object instances within transaction data 115 and/or master data 116. If data of a monitored field of an object is created or modified, the created or modified data is added to data dictionary 117. Accordingly, data dictionary 117 may be accessed to quickly determine all values associated with a monitored field.

Returning to FIG. 1, administrator 119 may wish to deploy transaction data to test/demo system 140 to test/demo operation thereof. According to some embodiments, administrator 119 accesses an interface of deployment tool 112 to create and/or select a transaction data template. A transaction data template provides metadata of a transaction object as well as values of a specific instance of the transaction object. Administrator 119 further operates deployment tool 112 to transmit transaction data template 118 to deployment system 120.

As will be described in detail below, deployment system 120 determines the master data-dependent fields of data template 118 and data generation component 122 generates a plurality of object instances which are identical except for the values of the master data-dependent fields and of the fields which include localization values (e.g., German (DE)-1010 as the sales organization code for sales order). Data generation component 122 uses data dictionary 117 to generate values of the master data-dependent fields for each of the plurality of object instances.

Each generated object instance is input to trained machine learning (ML) model 124 to determine whether it can be successfully deployed to another database system. More particularly, the field values of a generated object instance are input to ML model 124 and, in response, ML model operates per its training to output a likelihood of a Success (or Fail) classification. Instance filtering component 126 filters the generated object instances based on their associated classifications. For example, if 10000 instances are desired, instance filtering component 126 identifies the object instances associated with the 10000 highest likelihoods of success.

Upon command from administrator 119, deployment system 120 transmits identified instances 130 to system 140. Instances 130 may be stored in transaction data 144 of system 140. System 140 may then be operated to provide functionality based on object metadata 142, transaction data 144 and master data 146 as is known in the art.

Figure 4:
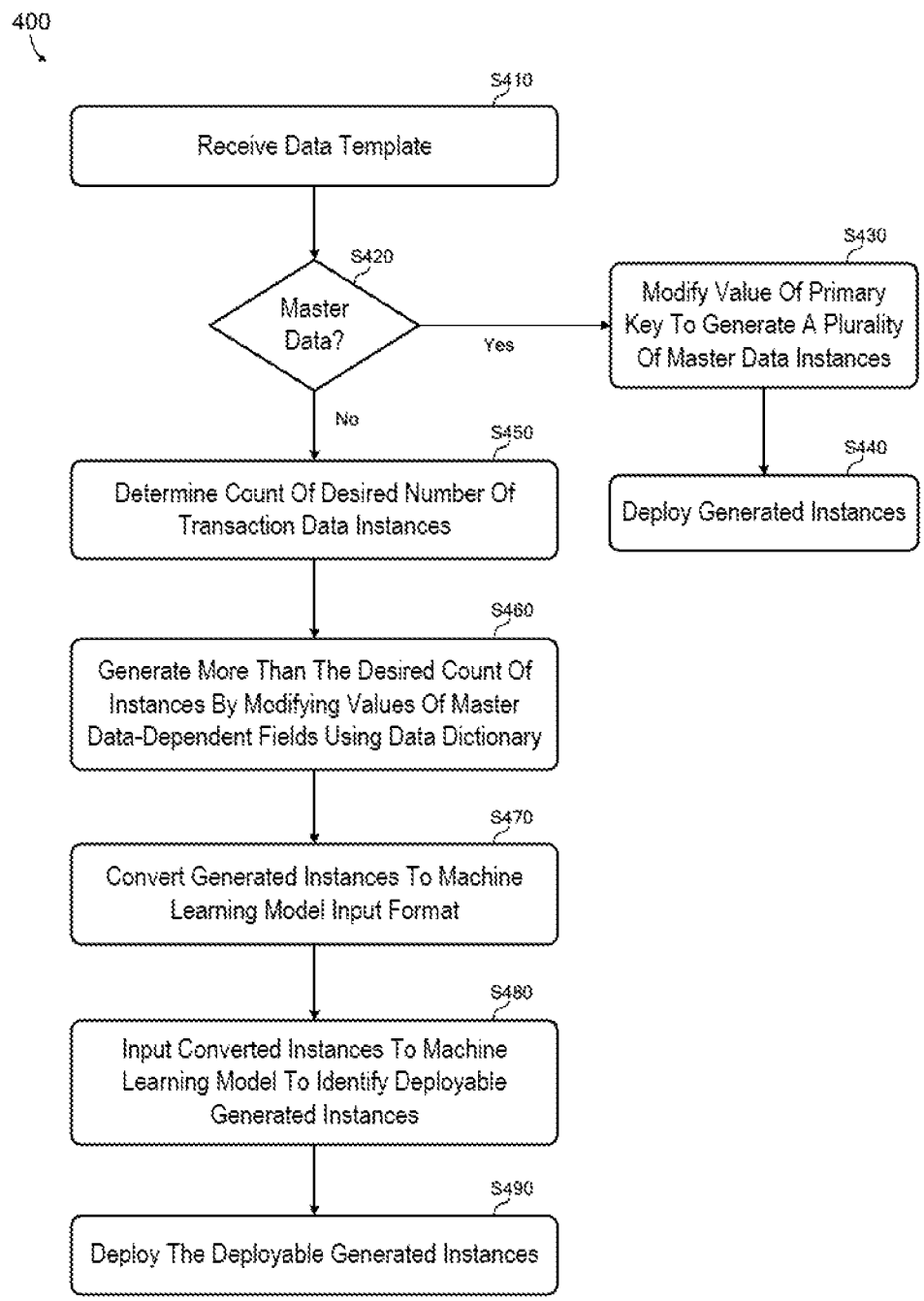
FIG. 4 is a flow diagram of a process to generate simulated transaction data according to some embodiments.

FIG. 4 comprises a flow diagram of process 400 to generate simulated transaction data according to some embodiments. Process 400 and the other processes described herein may be performed using any suitable combination of hardware and software. Software program code embodying these processes may be stored by any non-transitory tangible medium, including a fixed disk, a volatile or non-volatile random-access memory, a DVD, a Flash drive, or a magnetic tape, and executed by any number of processing units, including but not limited to processors, processor cores, and processor threads. Such processors, processor cores, and processor threads may be implemented by a virtual machine provisioned in a cloud-based architecture. Embodiments are not limited to the examples described below.

Initially, a data template is received at S410. As mentioned above, a system administrator may provide the data template to a deployment system at S410. According to some embodiments, the data template includes metadata defining an object and data of an instance of the object.

Figure 5:
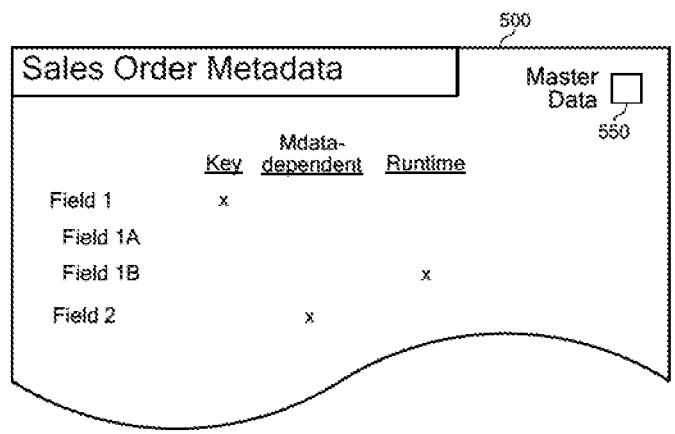
FIG. 5 is a representation of object metadata according to some embodiments.

FIG. 5 is a representation of object metadata 500 of a sales order object according to some embodiments. Object metadata 500 defines four fields and associates attributes with several of the defined fields. For example, Field 1 is defined as a key field and Field 1B is defined as a Runtime field. Field 2 is a master data-dependent field. As described above, the fields and attributes of object metadata 500 may be created and/or modified by a system administrator. Object metadata 500 may include many more fields and attributes than shown as well as other metadata.

Object metadata 500 includes check box 550. If check box 550 is checked, the associated object is considered a master data object and object instances which conform to object metadata 500 should be considered master data object instances.

Figure 6:
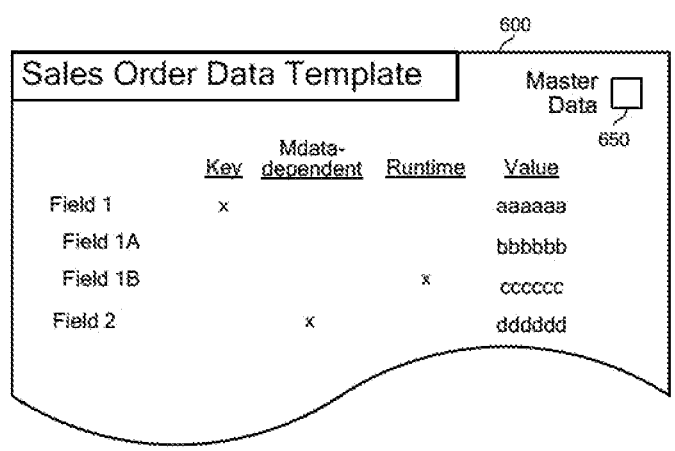
FIG. 6 is a representation of a data template according to some embodiments.

FIG. 6 illustrates data template 600 which may be received at S410 according to some embodiments. Data template 600 includes object metadata 500 as well as values for each of the fields of object metadata 500. According to some embodiments, data template 600 is received at S410 in a machine-readable format, such as a JavaScript Object Notation file.

At S420, it is determined whether the received data template represents a master data object instance. In the present example, it may be determined whether check box 650 of data template 600 is checked. If the received data template represents a master data object instance, flow proceeds to S430. At S430, a plurality of master data instances are generated which include values identical to the data template but which include different primary key values. The generated master data instances are then deployed to a system at S440.

Flow proceeds from S420 to S450 if it is determined that the received data template does not represent a master data object instance. At S450, a count of a number of desired transaction data instances to be deployed is determined. The count may be received from an administrator along with the data template at S410.

A number of transaction data instances is generated at S460. The number of generated transaction data instances is determined based on the count determined at S450. The number of generated transaction data instances may be selected in order to result in the desired number of deployed transaction data instances at the conclusion of process 400. In some embodiments, the number of generated instances is twice the determined count.

The transaction data instances are generated at S460 by modifying the values of the master data-dependent and localization fields of the data template using a data dictionary. The data dictionary may include transaction data values stored in the system from which the data template was received. The data dictionary may be a centrally-accessible component which stores transaction data values of more than one database system.

In some embodiments of S450, a Diversification Quotient constant is determined and used to set a diversification range. For example, if the count determined at S450 is 100, the determined Diversification Quotient may be 19. Next, at S460, 19 combinations of the master data-dependent values and localization field values are determined from the data dictionary. Using these 19 patterns, 100*2=200 transaction data instances are generated at S460.

Figure 7:
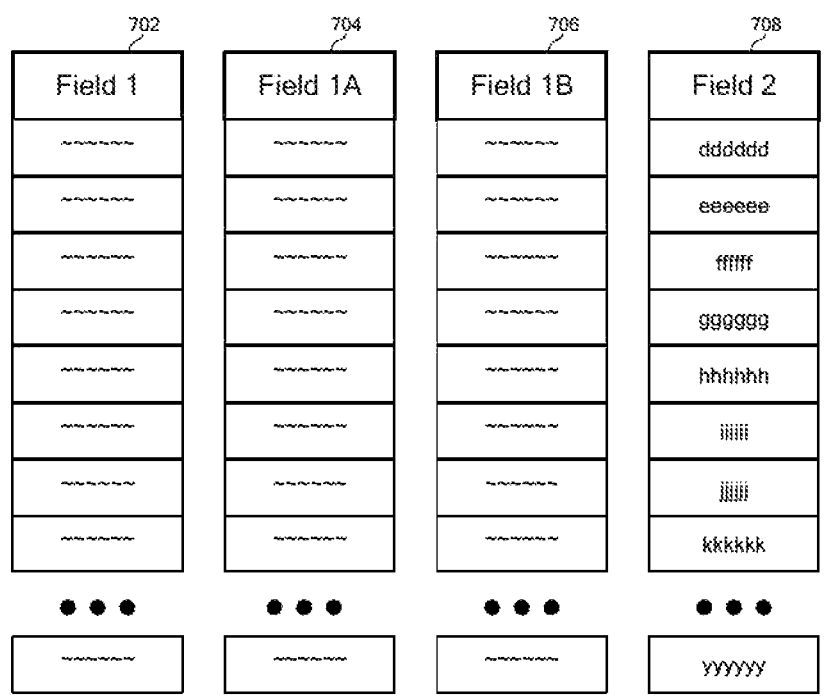
FIG. 7 is a tabular representation of a data dictionary according to some embodiments.

FIG. 7 is a tabular representation of a data dictionary according to some embodiments. The data dictionary includes four columns 702-708, each of which includes values associated with a respective field of the sales order object. Each row of a given column includes the value of the respective field in a given sales order object instance. In some embodiments, a given column of the data dictionary stores only one instance of a given value (i.e., no duplicate values).

As shown in data template 600, Field 2 of the sales order object is master data-dependent. Embodiments are not limited to one master data-dependent field per transaction data object. Accordingly, at S460, transaction data instances are generated including values identical to those of data template 600 except for the value of Field 2. The value of Field 2 in each transaction data instance is assigned from column 708 of the data dictionary. The assigned value may be picked at random from column 708 or in any order.

Figure 8:
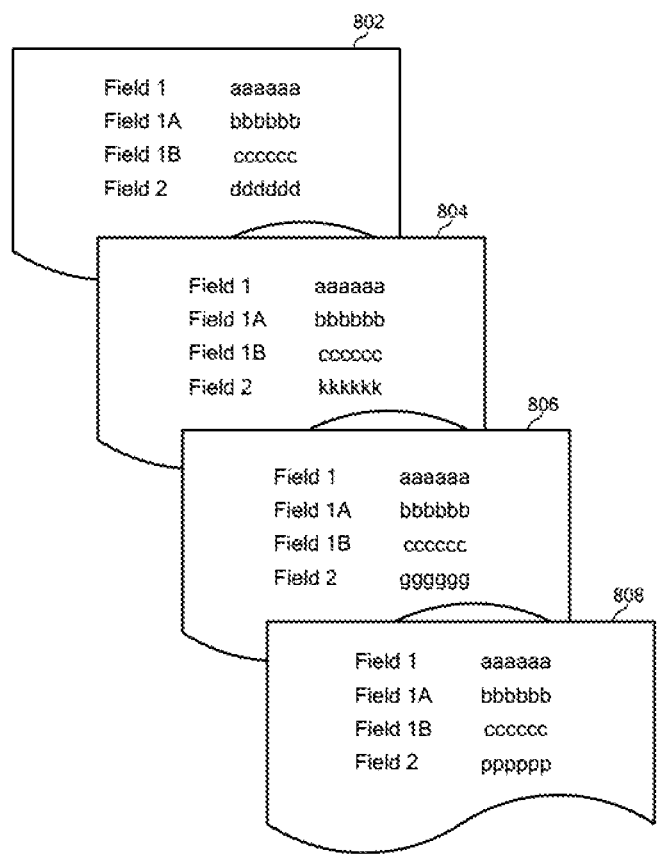
FIG. 8 illustrates simulated transaction data according to some embodiments.

FIG. 8 illustrates generated transaction data instances 802-808 according to some embodiments. As shown, the values of Field 1, Field 1A and Field 1B are identical in each of instances 802-808. The value of Field 2 differs in each of instances 802-808 and has been selected from column 708 of FIG. 7. If more than one field of the data template is master data-dependent, embodiments may operate to ensure that each generated transaction data instance includes a unique combination of values of the master data-dependent fields.

At S470, the generated instances are converted to an ML model input format. As is known in the art, the values of each instance may be converted into individual tokens which are represented numerically for input into the model. The tokenization proceeds at S470 in the same manner as was used to train the model based on training transaction data instances, which will be described below.

Each converted instance is input to an ML model at S480. The ML model outputs, for each input instance, a likelihood that the instance can be successfully deployed. Based on the likelihoods, a number of deployable generated instances are identified at S480. The identified deployable generated instances may consist of all instances associated with a Success likelihood greater than a threshold (e.g., 0.7). In some embodiments, the identified deployable generated instances are those associated with the top N-highest Success likelihoods, where N is the count determined at S450. Any logic may be used at S480 to identify deployable generated instances according to some embodiments.

The identified deployable generated instances are deployed to a system at S490. Deployment may consist of replicating the instances to the transaction data of the system, or any other suitable procedure.

Figure 9:
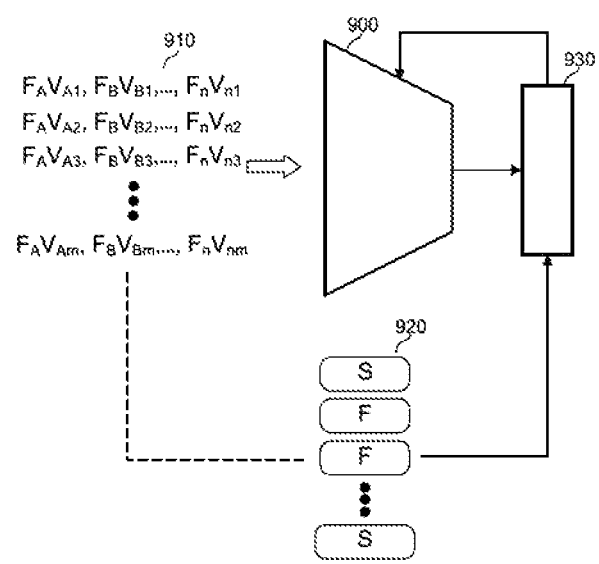
FIG. 9 illustrates training of a machine learning model according to some embodiments.

FIG. 9 illustrates training of machine learning model 900 for use at S480 according to some embodiments. Model 900 may comprise any type of iterative learning-compatible network, algorithm, decision tree, etc., that is or becomes known.

Model 900 may comprise a network of neurons which receive input, change internal state according to that input, and produce output depending on the input and internal state. The output of certain neurons is connected to the input of other neurons to form a directed and weighted graph. The weights as well as the functions that compute the internal states are iteratively modified during training using supervised learning algorithms as is known. The structure of model 900 may include convolutional layers and may be designed to infer a likelihood of deployment success for an input transaction data instance.

Model 900 is trained using M transaction data instances 910, each of which is associated with a respective one of classifications 920. The classification 920 associated with a transaction data instance indicates whether deployment of the transaction data instance was successful (i.e., "S") or failed (i.e., "F"). Instances 910 may be generated in any suitable manner, including manually and via copying existing transaction data instances from disparate database systems.

Each of M transaction data instances 910 includes a value V for each field of a transaction data object. The values are tokenized for input to model 900 during training.

Generally, training comprises inputting a batch of instances 910 into model 900, acquiring resulting classifications output by model 900, using loss layer 930 to compare the output classifications to corresponding ground truth classifications 920 corresponding to the input instances 910, modifying model 900 based on the comparison, and continuing in this manner until the difference between the output classifications of a test set of data instances (not shown) and the ground truth classifications of the test set (i.e., the network loss) is satisfactory.

Training causes model 900 to learn patterns and relationships in the data instances that are indicative of successful or failed deployments. Trained model 900 may be deployed using a set of linear equations, executable program code, a set of hyperparameters defining a model structure and a set of corresponding weights, or any other representation of the mapping of input to output which was learned as a result of the training. Deployed model 900 can then be used at S480 to predict the deployment status of a new, unseen transaction data instance. In particular, each of the generated and converted transaction data instances may be input into model 900 at S480 to predict its deployment classification.

Figure 10:
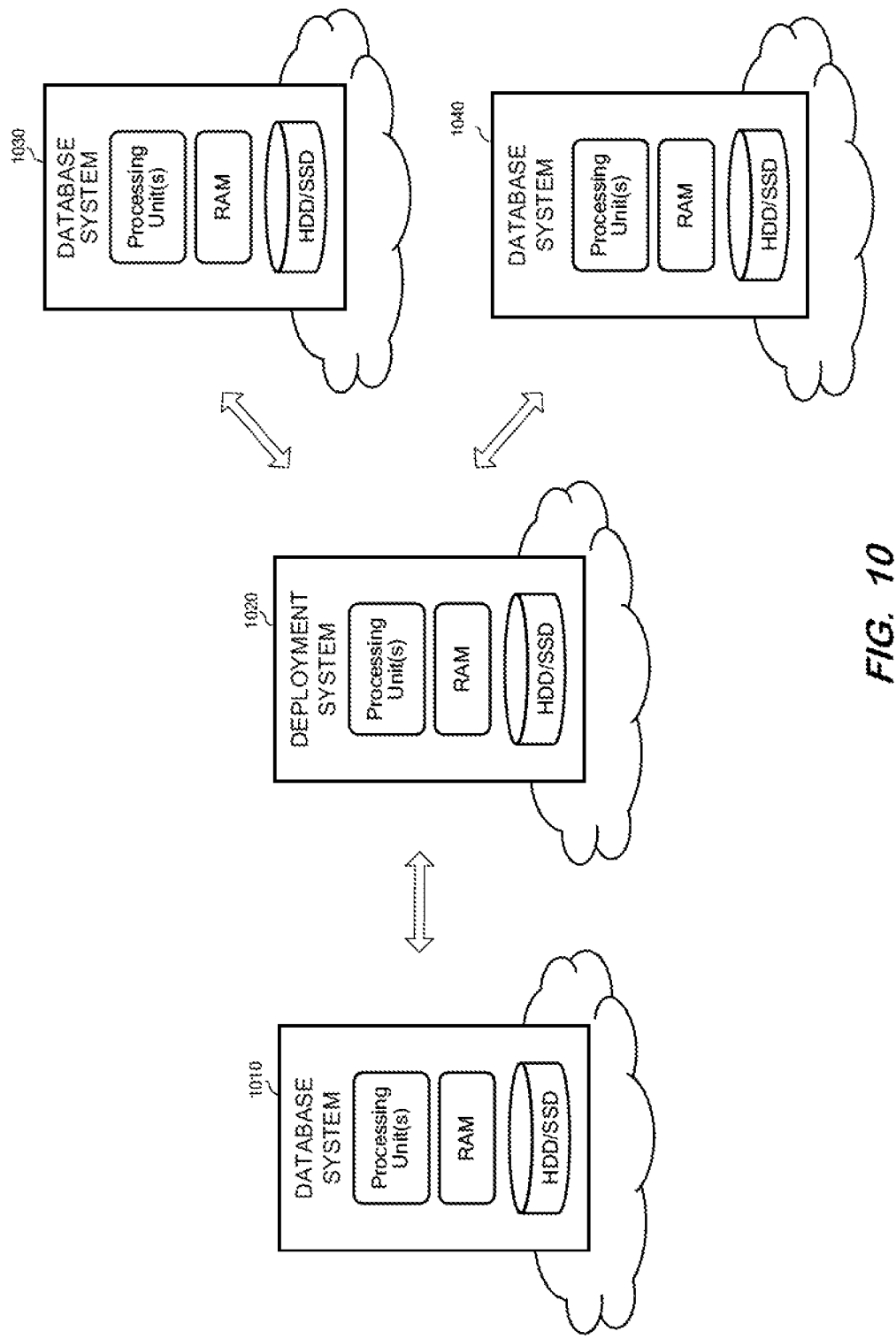
FIG. 10 is a diagram of a cloud-based implementation according to some embodiments.

FIG. 10 is a diagram of a cloud-based implementation according to some embodiments. Database system 1010 may comprise a system storing transaction data and from which a transaction data template is generated. Deployment system 1020 may operate as described herein to generate a plurality of transaction data instances for deployment based on the transaction data template and a data dictionary. The generated plurality of transaction data instances may be deployed to database systems 1030 and 1040. Each of systems 1010 through 1040 may comprise cloud-based resources residing in one or more public clouds providing self-service and immediate provisioning, autoscaling, security, compliance and identity management features. Each of systems 1010 through 1040 may comprise servers or virtual machines of respective Kubernetes clusters, but embodiments are not limited thereto.

The foregoing diagrams represent logical architectures for describing processes according to some embodiments, and actual implementations may include more, or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable recording media. Such media may include, for example, a hard disk, a DVD-ROM, a Flash drive, magnetic tape, and solid-state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
a memory storing program code; and
at least one processing unit to execute the program code to cause the system to:
receive a data object template comprising a plurality of fields and a respective value for each of the plurality of fields;
determine at least one master data-dependent field of the plurality of fields;
determine a desired number of data instances;
generate a plurality of data instances based on the desired number of data instances, each of the plurality of data instances comprising the respective value for each of the plurality of fields except for the at least one master data-dependent field, where a value of the at least one master data-dependent field in each of the plurality of data instances is different from the respective value of the at least one master data-dependent field in the data object template;
determine, for each of the plurality of data instances and using a machine learning model, a likelihood of successful deployment; and
determine a second plurality of the plurality of data instances for deployment by determining ones of the plurality of data instances which are associated with a likelihood based on the determined likelihoods of successful deployment greater than a threshold.

2. A system according to claim 1, wherein the plurality of data instances are generated based on a data dictionary of values associated with the at least one master data-dependent field.

3. A system according to claim 2, wherein the template identifies the at least one master data-dependent field.

4. A system according to claim 1, wherein the template identifies the at least one master data-dependent field.

5. A system according to claim 1, the at least one processing unit to execute the program code to cause the system to:
determine a desired number of data instances; and
determine to generate a multiple of the desired number of data instances.

6. A system according to claim 5, wherein determination of the second plurality of the plurality of data instances comprises determination of the desired number of data instances based on the determined likelihoods of successful deployment.

7. A system according to claim 1, wherein determination of the second plurality of the plurality of data instances comprises determination of ones of the plurality of data instances which are associated with a likelihood of successful deployment greater than a threshold.

8. A method comprising:
receiving a data object template comprising a plurality of fields and a respective value for each of the plurality of fields;
determining at least one master data-dependent field of the plurality of fields;
determining a desired number of data instances;
generating a plurality of data instances, based on the desired number of data instances, each of the plurality of data instances comprising the respective value for each of the plurality of fields except for the at least one master data-dependent field, where a value of the at least one master data-dependent field in each of the plurality of data instances is determined based on a data dictionary;
inputting each of the plurality of data instances into a machine learning model to | determine a likelihood of successful deployment for each of the plurality of data instances; and determining a second plurality of the plurality of data instances for deployment based on the determined likelihoods based on the determined likelihoods of successful deployment greater than a threshold; and
deploying the second plurality of the plurality of data instances to a target system.

9. A method according to claim 8, wherein the data dictionary comprises values associated with the at least one master data-dependent field.

10. A method according to claim 9, wherein the at least one master data-dependent field is determined based on the template.

11. A method according to claim 8, wherein the at least one master data-dependent field is determined based on the template.

12. A method according to claim 8, further comprising:
determining a desired number of data instances; and
determining to generate a multiple of the desired number of data instances.

13. A method according to claim 12, wherein determining the second plurality of the plurality of data instances comprises determining the desired number of data instances based on the determined likelihoods of successful deployment.

14. A method according to claim 8, wherein determining the second plurality of the plurality of data instances comprises determining ones of the plurality of data instances which are associated with a likelihood of successful deployment greater than a threshold.

15. A non-transitory computer-readable recording medium storing program code, the program code executable by at least one processing unit of a computing system to:
receive a data object template comprising a plurality of fields and a respective value for each of the plurality of fields;
determine at least one master data-dependent field of the plurality of fields;
determine a desired number of data instances;
generate a plurality of data instances, based on the desired number of data instances, each of the plurality of data instances comprising the respective value for each of the plurality of fields except for the at least one master data-dependent field, where a value of the at least one master data-dependent field in each of the plurality of data instances is different from the respective value of the at least one master data-dependent field in the data object template;
input each of the plurality of data instances into a machine learning model to determine a likelihood of successful deployment for each of the plurality of data instances; and
determine a second plurality of the plurality of data instances for deployment based on the determined likelihoods based on the determined likelihoods of successful deployment greater than a threshold; and
deploy the second plurality of the plurality of data instances to a target system.

16. A medium according to claim 15, wherein the plurality of data instances are generated based on a data dictionary of values associated with the at least one master data-dependent field.

17. A medium according to claim 16, wherein the at least one master data-dependent field is determined based on the template.

18. A medium according to claim 15, wherein the at least one master data-dependent field is determined based on the template.

19. A medium according to claim 15, the program code executable by at least one processing unit of a computing system to:
determine a desired number of data instances; and
determine to generate a multiple of the desired number of data instances, wherein determination of the second plurality of the plurality of data instances comprises determination of the desired number of data instances based on the determined likelihoods of successful deployment.

20. A medium according to claim 15, wherein determination of the second plurality of the plurality of data instances comprises determination of ones of the plurality of data instances which are associated with a likelihood of successful deployment greater than a threshold.

* * * * *